United States Patent [19]

Chamberlain et al.

[11] Patent Number: 5,466,545
[45] Date of Patent: Nov. 14, 1995

[54] COMPACT, SHOCK RESISTANT BATTERY PACK

[75] Inventors: Craig P. Chamberlain, Seattle; Dennis Lamb, Stanwood; William J. Lauby, Mukilteo; Howard T. Voorheis, Everett, all of Wash.

[73] Assignee: Fluke Corporation, Everett, Wash.

[21] Appl. No.: 379,165

[22] Filed: Jan. 27, 1995

[51] Int. Cl.⁶ .................................................. H01M 2/10
[52] U.S. Cl. ........................... 429/99; 429/98; 429/100; 429/121; 429/123; 429/159
[58] Field of Search ..................... 429/98, 99, 100, 429/121, 123, 159, 179

[56] References Cited

U.S. PATENT DOCUMENTS

| | | |
|---|---|---|
| 28,948 | 6/1860 | Smith et al. . |
| 28,949 | 7/1860 | Adams . |
| 3,887,394 | 6/1975 | Kaye ........................ 136/173 |
| 3,967,979 | 7/1976 | Kaye ........................ 136/173 |
| 4,091,187 | 5/1978 | Kaye ........................ 429/159 |
| 4,123,598 | 10/1978 | Hammel ..................... 429/159 |
| 4,515,872 | 5/1985 | Okano ....................... 429/65 |
| 4,593,461 | 6/1986 | Thiele et al. ............... 29/623.1 |
| 4,599,283 | 7/1986 | Thiele et al. ............... 429/99 |
| 4,666,278 | 5/1987 | Uematsu et al. ............. 354/288 |
| 5,059,885 | 10/1991 | Weiss et al. ................ 320/2 |
| 5,180,644 | 1/1993 | Bresin et al. ............... 429/98 |
| 5,298,347 | 3/1994 | Aksoy et al. ................ 429/98 |

*Primary Examiner*—Stephen Kalafut
*Assistant Examiner*—Richard H. Lilley, Jr.
*Attorney, Agent, or Firm*—Seed and Berry

[57] ABSTRACT

A battery pack includes a generally rectangular case formed by a bottom wall and a generally planar top wall. The top and bottom walls are separated by a pair of parallel side walls that are substantially normal to the top and bottom walls, and by first and second parallel end walls that are substantially normal to the top, bottom, and side walls. A portion of one end wall overhangs the remaining portion of the end wall, and the overhanging portion contains electrical contacts for the battery pack. The electrical contacts are recessed below the outer surface of the battery pack to reduce the likelihood of inadvertent short circuitry of the contacts. The battery pack includes a plurality of battery cells interconnected with circuit components to protect the battery pack during use and recharging.

23 Claims, 6 Drawing Sheets

COMPACT, SHOCK RESISTANT BATTERY PACK

TECHNICAL FIELD

This invention relates to battery packs, and more particularly to battery packs constructed for use with portable electronic test equipment that may be subject to rough usage.

BACKGROUND OF THE INVENTION

Electronic equipment requires a source of electrical power for operation. In electronic equipment where use mandates portability, such as electronic test equipment, batteries provide a source of electrical power that allows the equipment to be portable.

Housing batteries in a pack provides advantages over simply inserting cells singly into receiving equipment. For example, a battery pack disclosed in U.S. Pat. No. 3,887,394 issued to Kaye provides a lightweight means to easily insert a plurality of non-rechargeable battery cells into receiving equipment and to electrically connect the cells to electrical circuits in the receiving equipment. A battery pack of this nature can meet the electrical power requirements of consumer electronics with modest demands for electrical power, such as cameras, radios, and small pocket computers.

Portable electronic test equipment is often operated in an environment that is harsher than those presented by consumer electronics and by less demanding commercial electronic equipment, such as two-way portable radios. For example, electronic test equipment may fall from precarious placements needed to access test points in equipment. For example, the equipment to be tested may be located on the roof of a building or at the top of a telephone pole. A battery pack for electronic test equipment must therefore be of sufficiently rugged construction to not only absorb shocks without damaging the battery pack, but also to maintain power to the equipment while being exposed to shocks and vibration.

Prior art battery packs often have electrical contacts in the form of conductive pads that are accessible on a surface of the battery pack. The pads are held against contacts in the electrical device by a force exerted on the battery pack in the direction of the contacts. The pads of the battery packs of this type can easily lose contact with the contacts of the electrical device when the battery pack is subject to shock or vibration. A battery pack for electrical equipment subject to shock and vibration should therefore include means for absorbing shock and minimizing susceptibility to vibration to maintain continuous electrical contact with the electrical device.

Another problem with battery packs using conductive surface pads as battery contacts is their susceptibility to inadvertent shorting. Users may carry or store extra battery packs for electronic test equipment in tool bags or metal tool boxes. The conductive pads of a battery pack may inadvertently be shorted together by metal objects in the bag or by the conductive surface of the tool box. Thus, battery packs for electronic test equipment must include a means for preventing inadvertent shorting of their electrical contacts.

Many conventional battery packs are rechargeable so that they may be used over a considerable period. These battery packs require internal circuit components such as thermistors and thermal switches, to allow the batteries to be safely recharged. For example, a battery pack shown in U.S. Pat. No. 5,180,644 issued to Bresin et al. provides battery cells and associated recharging circuitry in a package suitable for use in two-way portable radios. However, the need to include circuit components in a battery pack can unduly increase the size of the battery pack. Yet the size of a battery pack is an important factor in making the equipment using the battery pack small enough to be hand-held.

SUMMARY OF THE INVENTION

It is therefore an object of the invention to provide a battery pack having a means of ensuring positive engagement and electrical connection between electrical contacts of the battery pack and electronic test equipment into which the battery pack has been inserted.

It is another object of the invention to provide a battery pack housing at least one battery cell and associated electronic circuitry in a case that absorbs shocks and is insensitive to vibration.

It is a further object of the invention to provide a battery pack with protective means to prevent inadvertent shorting of electrical contacts that are accessible in an outer wall of the battery pack when the battery pack is not contained within electronic test equipment.

It is still another object of the invention to provide a battery pack housing at least one battery cell and associated electronic circuitry in a highly compact manner to minimize the size of the battery pack.

These and other objects of the invention are provided by a battery pack having a battery assembly connected to two or more electrical contacts, all of which are enclosed in a case. The case is formed by a generally rectangular enclosure having a bottom wall, a generally planar top wall, a pair of parallel side walls that are substantially normal to the top and bottom walls, and first and second parallel end walls that are substantially normal to the top, bottom, and side walls. The top wall is longer than the bottom wall at the first end wall, and an adjoining portion of the first end wall projects outwardly beyond the remaining portion of the wall to form an overhanging portion. The overhanging portion provides the means for applying force to the contacts directly, thereby minimizing deflections and motion that can cause intermittent connections. The corners of the overhanging portion are preferably chamfered to guide the battery back into a battery receiving receptacle and maintain it in position inside the receptacle. The overhanging portion contains the electrical contacts, at least two of which function as positive and negative terminals. The electrical contacts are preferably positioned in respective notches in the overhanging portion at opposite sides of the top wall to substantially maximize the spacing between the contacts. The overhanging portion can be either solid or hollow, and, if hollow, may be strengthened by reinforcing members. Longitudinal troughs conforming to the length, shape, and orientation of battery cells in the battery assembly may be formed in the bottom of the case. In order to vent gases generated during recharging of the battery pack, vents may be formed in the case. The battery pack also preferably contains electronic circuitry for performing a variety of functions. The circuitry may be placed between in spaces formed between adjacent battery cells and the top wall of the case to minimize the size of the battery pack.

BRIEF DESCRIPTION OF THE DRAWINGS

An embodiment of a battery pack according to the present invention will now be described, by way of example only and not of limitation, with reference to the following drawings, in which.

DETAILED DESCRIPTION OF THE INVENTION

Figure 1:
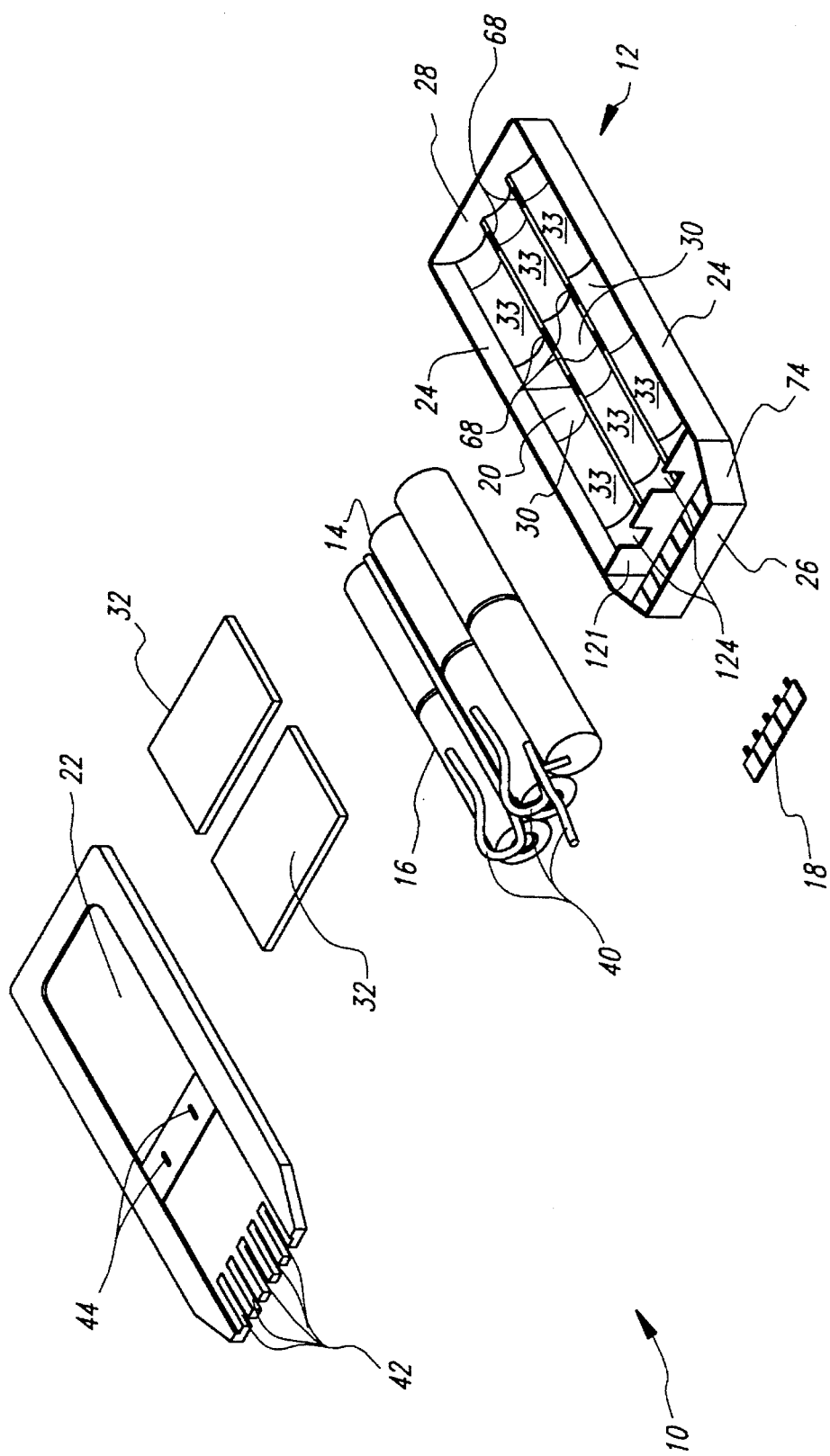
FIG. 1 is an exploded isometric view of a battery pack according to the present invention comprising a case, a battery assembly, and electrical contacts.

As illustrated in FIG. 1, a preferred embodiment of a battery pack 10 includes a case 12, a battery assembly 14 of generally cylindrical, interconnected battery cells 16, and electrical contacts 18. The case 12 is generally rectangular and is formed by a bottom wall 20, a generally planar top wall 22, a pair of parallel side walls 24 that are normal to the top wall 22 and the bottom wall 20, and first and second parallel end walls 26 and 28 that are normal to the top wall 22, the bottom wall 20, and the side walls 24. The battery assembly 14 is placed into the case 12 with pairs of longitudinally aligned battery cells 16, placed in respective arcuate battery cradles 30. The battery assembly 14 is preferably held in position by placing two sheets of double adhesive-backed tape 32 between the battery cells 16 and the inner surface of top wall 22 and strips of adhesive-backed tape 33 along the inner surface of the battery cradles 30. The electrical contacts 18 are placed inside the case 12 just behind the end wall 26, and leads 40 from the battery cells 16 are connected to the contacts 18. The top wall 22 covers the enclosure 12 except for the contacts 18, which are accessible through slots 42 formed at one end of the top wall 22. Vents 44, 68 are formed in the top wall 22 and in the bottom wall 20 of the case 12 to allow gasses produced by the battery cells 16 during recharging to escape from the case 12. A bulkhead 121 having notches 124 is formed at one end of the case 12. A circuit board (not shown in FIG. 1) is placed in the area bounded by the bulkhead 121 and the end wall 26. Conductive leads from the circuit board extend through the notches 124 to allow the circuit board to make contact with the battery cells 16 either directly or through wires (not shown).

Figure 2:
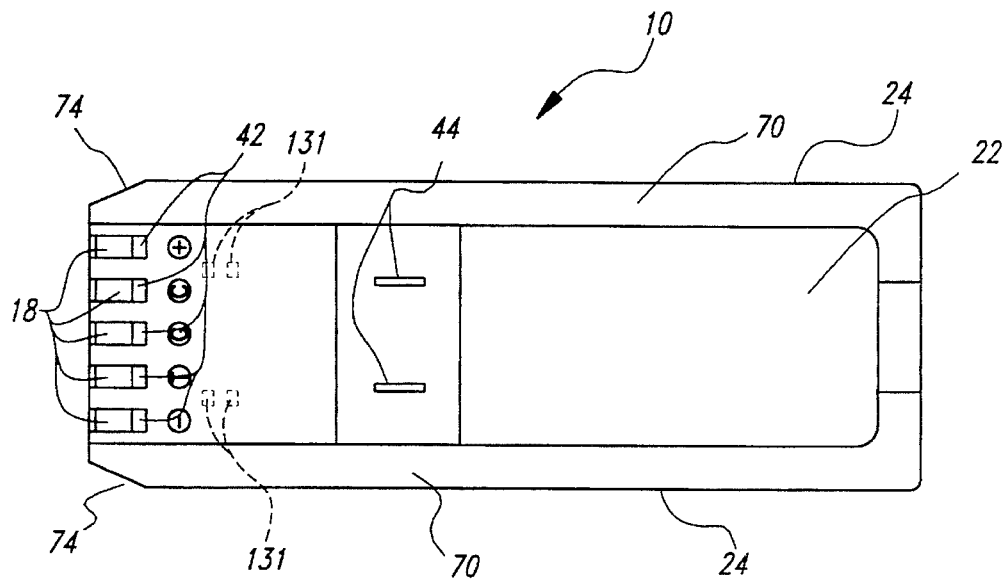
FIG. 2 is a top plan view of a top wall of a case of a battery pack according to the present invention.
Figure 5:
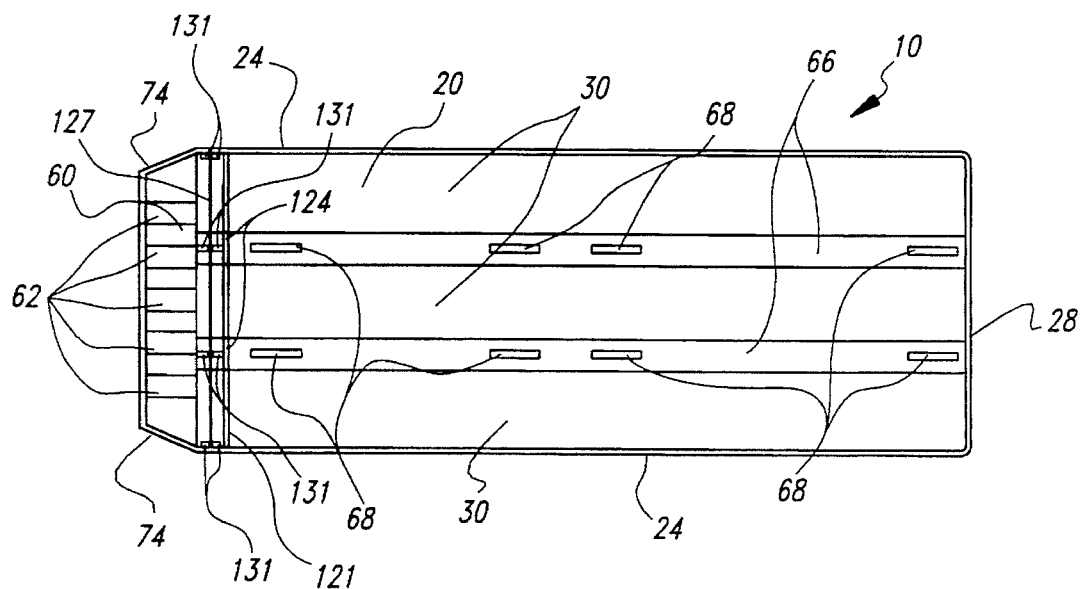
FIG. 5 is a bottom plan view of the battery pack according to the present invention.
Figure 7:
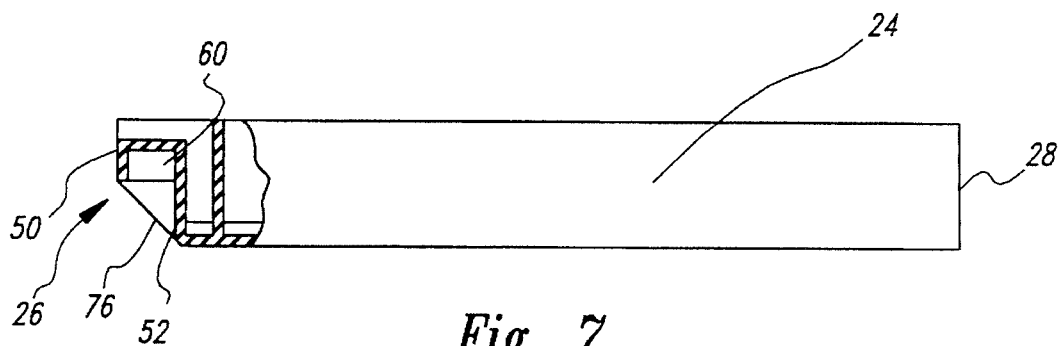
FIG. 7 is a side elevational view of a case of a battery pack according to the present invention.

With further reference to FIGS. 2, 5, and 7, the top wall 22 is preferably longer than the bottom wall 20 at the first end wall 26 adjacent the electrical contacts 18. A portion 50 of the first end wall 26 thus overhangs a portion 52 of the first end wall 26 that is recessed behind the overhanging portion 50. The overhanging portion 50 forms an interface to allow the battery pack 10 to interface with electronic test equipment (not shown) into which the battery pack 10 is inserted.

Figure 3:
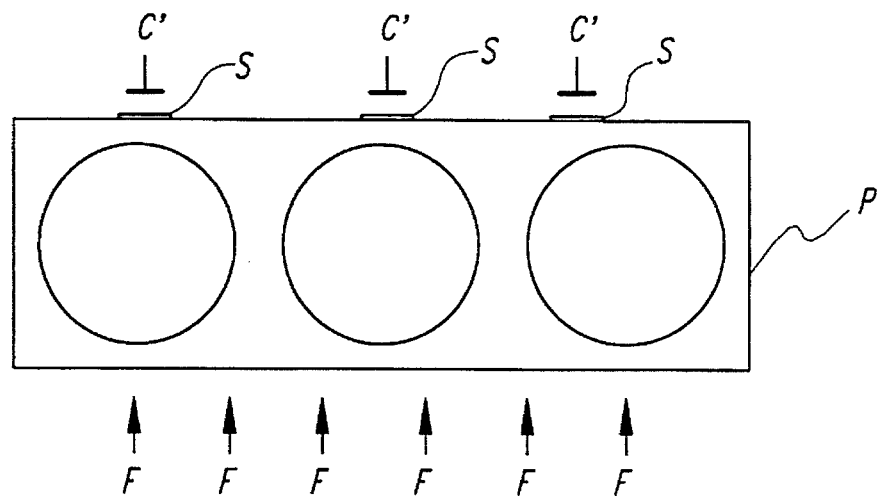
FIG. 3 is a schematic drawing illustrating the manner in which prior art battery packs often fail to maintain electrical contact with an electrical device in the presence of shock or vibration.

The manner in which the overhanging portion 50 is able to maintain good electrical contact with electronic equipment in which the battery pack is inserted is best illustrated with reference to FIGS. 3 and 4. The prior art battery pack P, shown in FIG. 3, contacts S on the surface of the battery pack P are maintained in contact with the contacts C' of the electronic equipment by either applying forces F to the pack P toward the contacts C' or the contacts C' being resiliently biased against the battery pack contacts S. The pack P itself is generally not very rigid because the case of the pack P must be hollow to receive the batteries, and the walls of the case should be relatively thin so that the battery pack P is compact and lightweight. As a result, the battery pack P can deform or compress when subject to shock or vibration, thereby causing the battery pack P to lose contact with the contacts C', particularly when the battery pack P is subject to shock or vibration.

Figure 4:
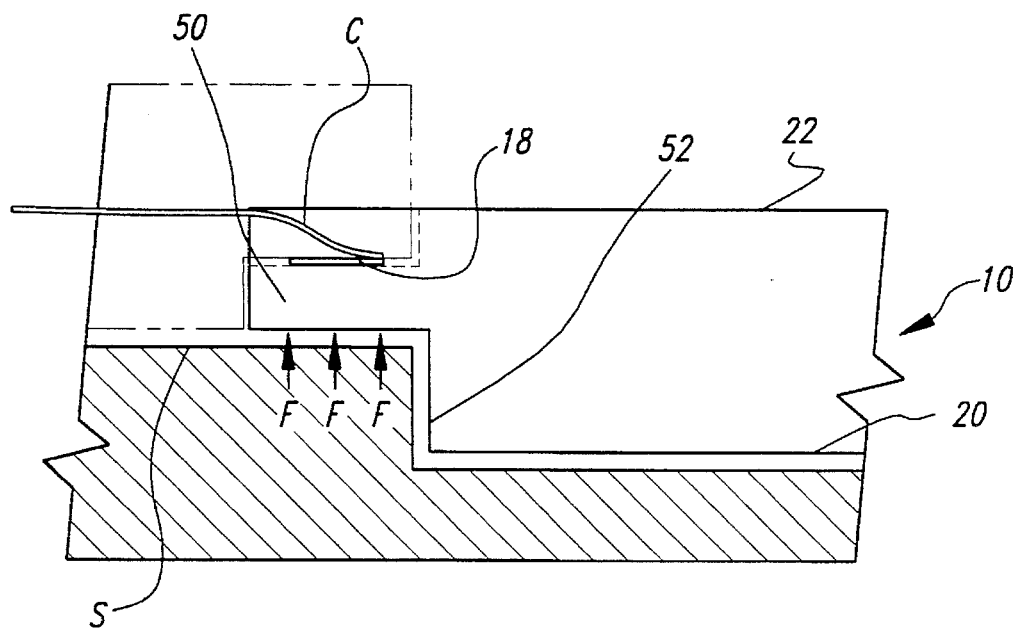
FIG. 4 is a schematic drawing partially in cross section illustrating the manner in which the battery pack according to the present invention is able to maintain electrical contact with an electrical device in the presence of shock or vibration.

In contrast, the manner in which the inventive battery pack is able to maintain contact in the presence of shock and vibration is illustrated in FIG. 4. The electrical contacts 18 of the battery pack are positioned against the contacts C of the electronic equipment in the overhanging portion 50. The battery pack contacts 18 are forced against the equipment contacts C either by applying forces F toward the contacts C or by the contacts C being resiliently biased against the contacts 18. The overhanging portion need not be hollow because it does not contain any batteries. As a result, it can be solid or rigidly reinforced so that the overhanging portion 50 does not compress or deform when the contacts 18 in the overhanging portion 50 are forced against the contacts C, thereby forcing the overhanging portion 50 against a surface S of the electronic equipment. The overhanging portion 50, by being solid or reinforced, ensures that the battery pack contacts 18 remain in contact with the equipment contacts C when the battery pack 10 is subject to shock or vibration.

As best shown in FIG. 7, a generally rectangular hollow chamber 60 is preferably formed in the overhanging portion 50 of the first end wall 26. The hollow chamber 60 may interface with a locking mechanism (not shown) in the electronic test equipment (not shown) for securely retaining the battery pack 10 in the electronic test equipment (not shown). With further reference to FIG. 5, a plurality of spaced-apart reinforcing members 62 are preferably formed in the hollow chamber 60. The reinforcing members 62 increase the hollow chamber's rigidity even further, thus increasing the resistance of the battery pack 10 to loads induced by shock or vibration. As explained above with reference to FIGS. 3 and 4, this relatively rigid overhanging structure allows the inventive battery pack 10 to maintain electrical contact with electronic equipment into which it is inserted far better than conventional battery packs.

As shown in FIG. 5, the bottom wall 20 preferably includes ribs 66 formed between the arcuate battery cradles 30. Additional vents 68 are formed in the ribs 66 to further vent gasses from the case 12 that build up during recharging.

As best shown in FIG. 2, the top wall 22 includes edge formed rails 70 that align the battery pack 10 properly within a receiving cavity of electronic test equipment (not shown) during insertion, and retain the battery pack 10 in proper alignment during normal use in which the battery pack 10 may be exposed to physical shock. The rails 70 thus provide even further protection against shock and vibration.

With reference to FIG. 5, the circuit board 127 is positioned behind the bulkhead 121 (FIG. 1). The circuit board 127 is sandwiched between a plurality of adjacent shoulders 131 on the inner surfaces of the bottom wall 20, side walls 24, and top wall (FIG. 2) to hold the circuit board in position.

The case 12 of the battery pack 10 also includes corner chamfers 74 (FIGS. 1, 2 and 5), as well as an edge chamfer 76 (FIG. 7) to ease insertion of the battery pack 10 into an electrical device and to permit proper alignment of the battery pack 10 in the receiving cavity (not shown) of electronic equipment. The chamfer 74, shown in FIGS. 1, 2 and 5, is located at corners of each side wall 24 and the end wall 26. As shown in FIG. 6A, this chamfer 74 may contact the exterior surfaces S of the electronic equipment E adjacent the entrance to the battery receiving cavity R as the battery pack 10 is inserted into the cavity R. This structure thus guides the battery pack 10 into the battery receiving cavity R.

Figure 6B:
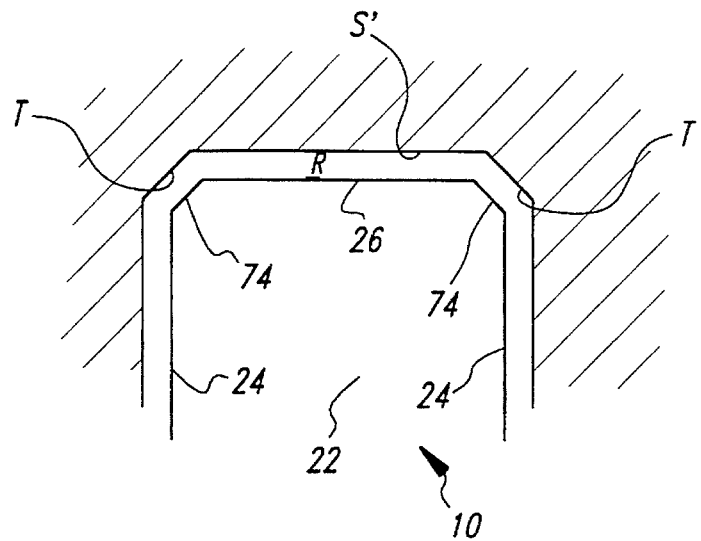
FIGS. 6A and 6B are schematic drawings illustrating the manner in which the battery pack according to the present invention is guided into a receiving aperture and held in place once inserted therein because of the configuration of the battery pack.
Figure 6A:
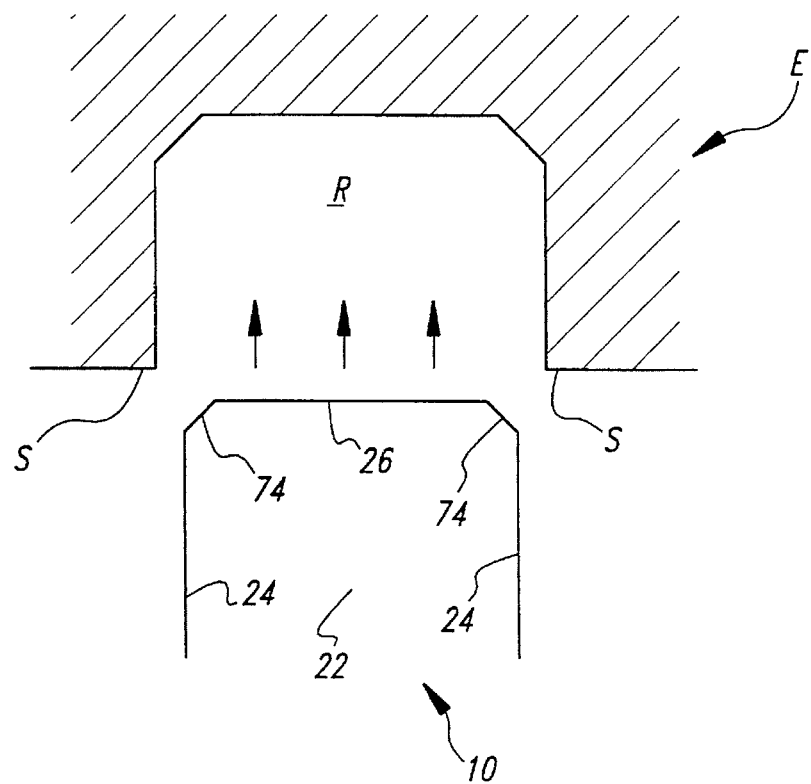

As shown in FIG. 6B, the chamfer 74 also cooperates with correspondingly-shaped internal surfaces S' in the battery receiving cavity R to restrict movement of the battery pack 10. More specifically, when the corner chamfers 74 contact tapered surfaces T that may be formed inside the battery receiving cavity R, the contact prevents the battery pack from moving either laterally or longitudinally. The other chamfers 76 (FIG. 2) may also contact a correspondingly-shaped surface (not shown) in the battery receiving cavity R to maintain the battery pack 10 in position in the same manner that the chamfers 74 perform these functions, as illustrated in FIGS. 6A and 6B.

Figure 10:
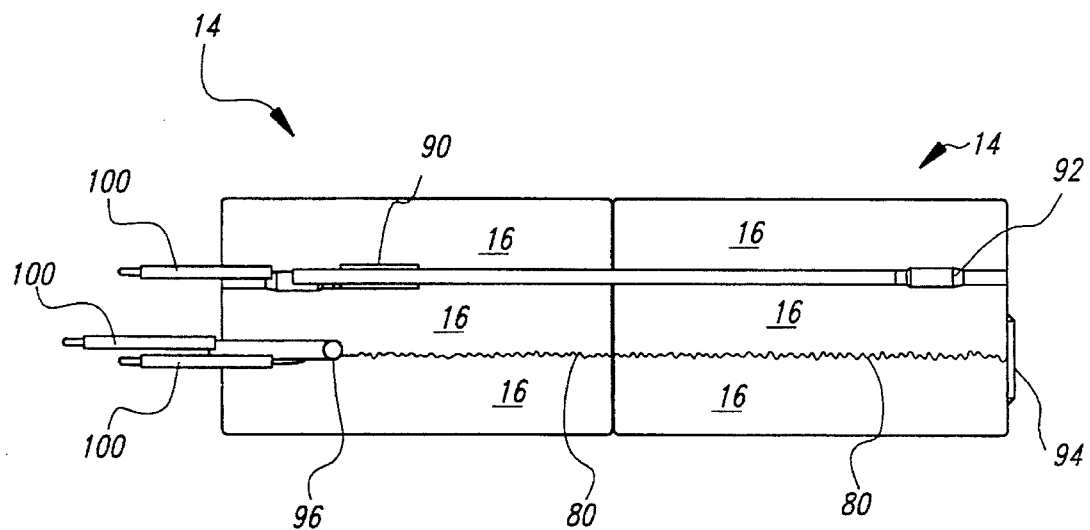
FIG. 10 is a top plan view of a battery assembly of a battery pack according to a preferred embodiment of the present invention.
Figure 11:
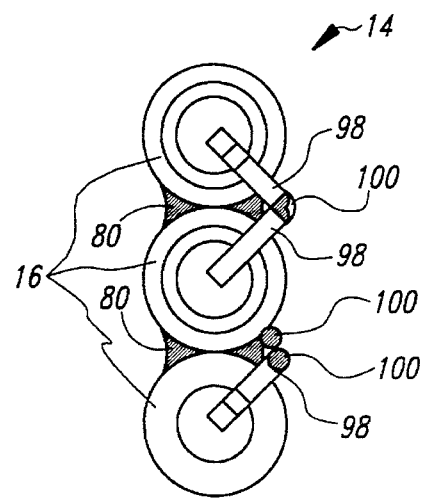
FIG. 11 is an end elevational view of the battery assembly of FIG. 10.

FIGS. 10 and 11 show a preferred embodiment of the battery assembly 14 including a plurality of the battery cells 16. The battery cells 16 may comprise rechargeable batteries, including Nickel Cadmium (NiCd) and Nickel Metal Hydride (NiMH) cells. During charging, rechargeable cells may emit gases, such as hydrogen gas. As explained above, in order to relieve pressure and to prevent a potentially explosive accumulation of gases, vents 44 (FIG. 1) and 68 (FIG. 5) are formed in the top and bottom walls 22 and 20, respectively.

Adjacent cylindrical battery cells 16 are bound together longitudinally to form a composite unitary pair of battery cells 16. The cells 16 are preferably bound with adhesive 80 laid in fillets in the longitudinal grooves between adjacent cells 16. Binding together the cells with adhesive maximizes the structural integrity of the unitary pairs of cells 16 and thus maximizes shock absorption capabilities of the battery pack 10. Binding the cells 16 with adhesive also minimizes space dedicated to a binding means and thus maximizes space available within the case 12 for mounting components such as a bimetal thermal switch 90, a non-resettable thermal fuse 92, or a thermistor 96 which are placed into longitudinal grooves between the cells 16 to most efficiently use space available within the battery pack 10. A circuit breaker 94 is placed across the ends of adjacent battery cells 16 to serve as an inter-cell connector. Longitudinally positioned battery cells 16 are connected together by flat leads doubled over and welded to the ends of the cells (not shown), while laterally adjacent cells 16 are interconnected by flat leads 98 welded to the ends of the cells 16, as best illustrated in FIG. 11. The other ends of the leads 98 are connected to each other and/or to wires 100. The wires are, in turn, connected to respective electrical contacts 18 (FIG. 1). The battery assembly 14 is then placed in the case 12, and the top wall 22 is bonded to the side wall 24 and the end walls 26, 28.

As mentioned above, the battery assembly 14 delivers its electrical power to electronic test equipment (not shown), and receives charging current from battery charging equipment (not shown), via the electrical contacts 18. Two of the end contacts 18 labeled "+" and "−" function as positive and negative terminals, while the middle contact 18 functions as an output terminal for a "gas gauge," labeled "G," i.e., a battery charge state indicator. Spacing the positive and negative contacts 18 as far apart as possible in this manner is generally desirable because it minimizes the possibility of a direct short between the positive and negative contacts caused by external, electrically conductive objects. Furthermore, recessing the contacts 18 in respective slots 42 beneath the surface of the top wall 22, as described above, prevents inadvertent shorting of the electrical contacts 18 by a flat conductive surface such as might be found in a tool box or the like. The slots 42 are preferably formed in the portion of the top wall 22 that extends past the bottom wall 20. In order to provide better access to the contacts 18 by the electrical contacts (not shown) of the electrical device receiving the battery pack 10, the inner edges of the slots 42 are preferably sloped so they face outwardly.

Figure 8:
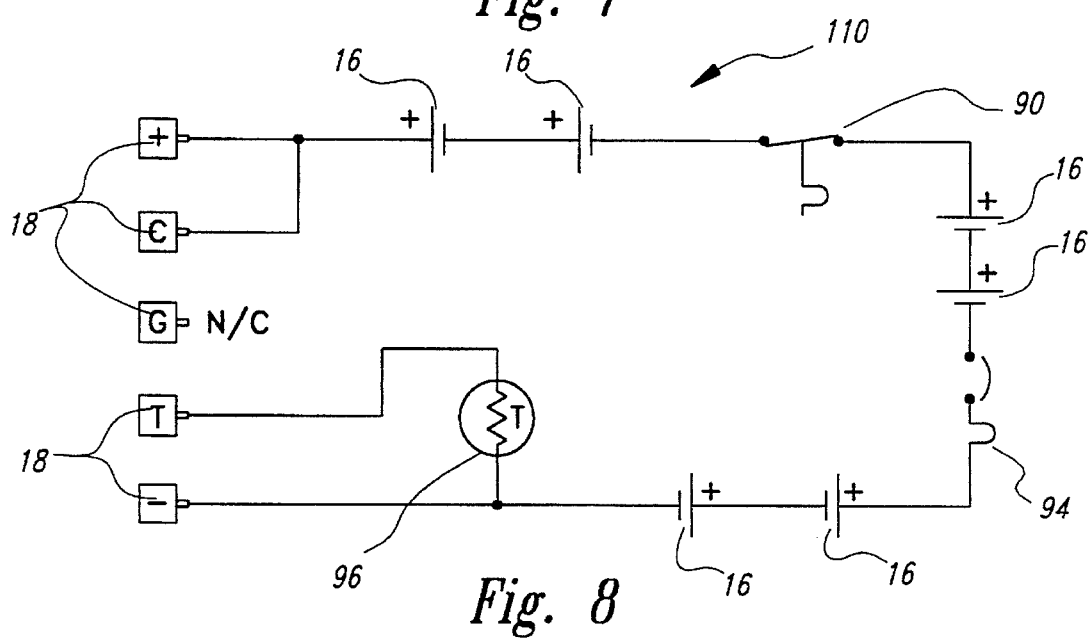
FIG. 8 is a schematic diagram of the circuitry associated with a battery pack according to a preferred embodiment of the present invention.

In order to ensure safe charging and operation of NiCd battery cells 16, the preferred embodiment of the inventive battery pack 10 uses an electronic circuit 110, shown schematically in FIG. 8. The circuit 110 includes the series combination of 6 battery cells 16, a circuit breaker 94 provided for short circuit protection, and the thermal switch 90 for high temperature protection during charging of the battery cells connected between the outer electrical contacts 18. The thermistor 96 allows an external battery charger (not shown) to detect overheating of the battery cells 16 and then terminate charging to protect the circuit and cells 16. The thermistor 96 may also be used to provide charge information to the external battery charger. The thermistor 96 is connected to the battery charger (not shown) through one of the contacts 18, labeled "T."

Figure 9:
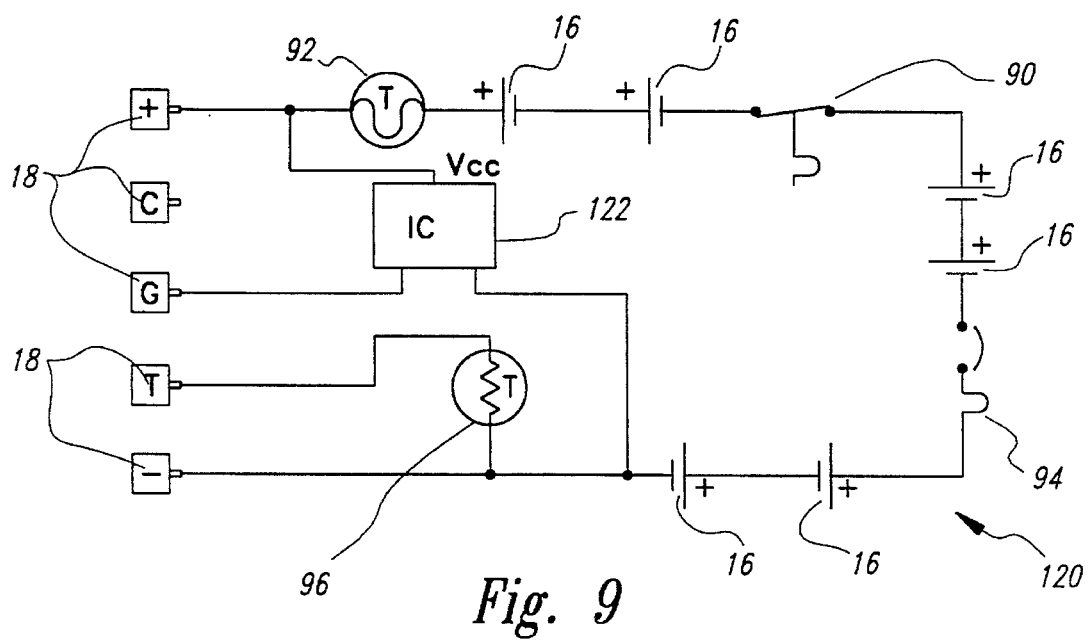
FIG. 9 is a schematic diagram of the circuitry associated with a battery pack according to an alternative embodiment of the present invention.

An alternative embodiment of the present invention uses an electronic circuit 120, shown schematically in FIG. 9, to ensure safe charging and operation of battery cells 16 of the NiMH type. The circuit 120 includes, in addition to the components comprising the circuit 110, the non-resettable thermal fuse 92 for high temperature protection during charging. The circuit 120 also includes an integrated circuit 122 to maintain a record of the available charge of the battery cells 16 and to provide that record to the instrument.

It should be noted that the use of an extra charging contact in the embodiments of FIGS. 8 and 9 prevent damage to the battery pack or charger if the battery pack is inserted into the wrong type of charger. For example, if the embodiment of FIG. 9 is inserted into a charger for the embodiment of FIG. 8, the charge current provided at the terminal "C" will have no effect on the battery pack embodiment of FIG. 9. Also, the use of an extra contact allows a battery charger to be designed that can charge both battery pack embodiments. For example, a charging circuit for a NiCd battery can be connected to the terminal of a charger at the location of the terminal "C." A charger circuit for a NiMH battery can be connected to the terminal of the charger at the location of the terminal "+."

From the foregoing, it will be appreciated that, although embodiments of the invention have been described herein for purposes of illustration, various modifications may be made without deviating from the spirit and scope of the invention. Accordingly, the invention is not limited except as by the following claims.

We claim:

1. A battery pack comprising:
   (a) a case comprising a generally rectangular enclosure, said enclosure formed by a bottom wall and a generally planar top wall, said top and bottom walls being separated by a pair of parallel side walls that are normal to said top and bottom walls, and first and second parallel end walls that are normal to said top, bottom, and side walls, said top wall being longer than said bottom wall at said first end wall, and a portion of said first end wall that intersects said top wall being positioned farther from said second end wall than a portion of said first end wall that intersects said bottom wall;
   (b) a battery assembly comprising a plurality of battery cells housed in said case; and
   (c) two or more generally planar electrical contacts, the plane of each of said electrical contacts generally parallel to the plane of said top wall, each of said electrical contacts being positioned in a notch in a portion of said top wall extending past said bottom wall and recessed under an outer surface of said top wall, each of said electrical contacts functioning as positive and negative terminals connected to said battery assembly.

2. The battery pack of claim 1, further comprising a generally rectangular hollow chamber formed by a portion of said side walls extending past said bottom wall to said portion of said first end wall that intersects said top wall, said top wall, and said first end wall that intersects said top wall.

3. The battery pack of claim 2, further comprising reinforcing members in said hollow chamber, said reinforcing strength members being parallel to said side walls and normal to said top wall and first end wall.

4. The battery pack of claim 1 wherein said battery pack further includes vents extending through said case to allow cases generated by said battery cells during charging to be vented to the external environment.

5. The battery pack of claim 1 wherein said electrical contacts for said positive and negative terminals are spaced at opposite edges of said top wall adjacent respective side walls to substantially maximize the spacing between said contacts.

6. The battery pack of claim 1 wherein said electrical contacts are electrically connected to a circuit board electrically connected to said battery cells, said circuit board housed in said case.

7. The battery pack of claim 6 wherein said circuit board further includes at least one integrated circuit electrically coupled to said battery cells.

8. The battery pack of claim 7 wherein said integrated circuit capable of maintaining a record of the available charge of said battery cells.

9. The battery pack of claim 1 wherein a top surface of said top wall further comprises rails along the entirety of said top surface adjacent said side walls.

10. The battery pack of claim 1, further comprising ribs in said bottom wall, said ribs comprising longitudinal troughs generally conforming to the length, shape, and orientation of said battery cells.

11. The battery pack of claim 1 wherein said case comprises a chamfer in said portion of each of said side walls extending past said bottom wall to said portion of said first end wall that intersects said top wall.

12. The battery pack of claim 1 wherein said case further comprises a chamfer from said portion of said first end wall that intersects said top wall to said portion of said first end wall that intersects said bottom wall.

13. The battery pack of claim 1 wherein said top wall comprises a chamfer from said notch toward said second end wall.

14. A method for housing a circuit structure in a battery pack of the type having a plurality of cylindrical battery cells, electrical contacts, intercell connections, and leaded electronic components enclosed in a case, said method comprising:
   (a) binding together adjacent cylindrical battery cells longitudinally to form a composite unit of said cells, said composite unit comprising grooves at longitudinal junctions of said adjacent battery cells;
   (b) electrically interconnecting said battery cells with said plurality of intercell connections and said plurality of leaded electronic components;
   (c) placing said plurality of leaded electronic components into said longitudinal grooves;
   (d) placing said composite unit of battery cells with said plurality of leaded electronic components located in said longitudinal grooves into said case; and
   (e) electrically connecting said battery cells to said plurality of electrical contacts.

15. A method of claim 14, further comprising binding together said adjacent cylindrical battery cells longitudinally with adhesive.

16. A method of claim 14, further comprising placing double-back tape between said composite unit of said cells and an inner surface of said case.

17. A method of claim 14, further comprising electrically connecting said battery cells to a circuit board electrically connected to said plurality of electrical contacts.

18. A method of claim 17, further comprising mounting an integrated circuit on said circuit board and electrically connecting said circuit board to said integrated circuit.

19. A method of claim 14, further comprising electrically interconnecting said battery cells with a circuit breaker connection tab.

20. A method of claim 14, further comprising electrically interconnecting said battery cells with a thermal switch and placing said thermal switch into said longitudinal grooves.

21. A method of claim 14, further comprising electrically interconnecting said battery cells with a thermistor and placing said thermistor into said longitudinal grooves.

22. A method of claim 14, further comprising electrically interconnecting said battery cells with a non-resettable thermal fuse and placing said non-resettable thermal fuse into said longitudinal grooves.

23. A method of claim 14, further comprising performing step (e) before performing step (d).

* * * * *